United States Patent
Grover et al.

(10) Patent No.: US 12,368,722 B2
(45) Date of Patent: Jul. 22, 2025

(54) TYING ANOMALIES TO AUTHENTICATION LEVELS

(71) Applicant: MICRO FOCUS LLC, Santa Clara, CA (US)

(72) Inventors: Douglas Max Grover, Rigby, ID (US); Michael F. Angelo, Houston, TX (US)

(73) Assignee: Micro Focus LLC, Santa Clara, CA (US)

( * ) Notice: Subject to any disclaimer, the term of this patent is extended or adjusted under 35 U.S.C. 154(b) by 208 days.

(21) Appl. No.: 18/121,488

(22) Filed: Mar. 14, 2023

(65) Prior Publication Data
US 2024/0314137 A1    Sep. 19, 2024

(51) Int. Cl.
*H04L 9/40*    (2022.01)
(52) U.S. Cl.
CPC .......... *H04L 63/105* (2013.01); *H04L 63/08* (2013.01); *H04L 63/1425* (2013.01)
(58) Field of Classification Search
CPC .... H04L 63/08; H04L 63/1425; H04L 63/105
See application file for complete search history.

(56) References Cited

U.S. PATENT DOCUMENTS

| | | | |
|---|---|---|---|
| 9,426,139 | B1 | 8/2016 | McClintock |
| 9,952,891 | B2 | 4/2018 | Zada |
| 10,476,854 | B2 * | 11/2019 | Arora ............... H04L 9/0858 |
| 2020/0311603 | A1 | 10/2020 | Qiu |

FOREIGN PATENT DOCUMENTS

CN    102546648 B    4/2015

OTHER PUBLICATIONS

Chained Anomaly Detection Models for Federated Learning: An Intrusion Detection Case Study Davy Preuveneers, Vera Rimmer, Ilias Tsingenopoulos, Jan Spooren, Wouter Joosen, and Elisabeth Ilie-Zudor Dec. 18, 2018 (Year: 2018).*

* cited by examiner

*Primary Examiner* — Benjamin A Kaplan
(74) *Attorney, Agent, or Firm* — Sheridan Ross P.C.

(57) ABSTRACT

An anomaly on a computer network is identified by processing data generated by the computer network. The anomaly is identified based on a first anomaly threshold of a plurality of anomaly thresholds associated with the anomaly. In response to determining that the anomaly has met the first anomaly threshold of the plurality of anomaly thresholds associated with the anomaly, a first authentication level associated with the first anomaly threshold is identified. The plurality of anomaly thresholds associated with the anomaly have a plurality of associated authentication levels. A user interface is displayed to an administrator that includes a prompt to authenticate the administrator at the first authentication level. Authenticating the administrator at the first authentication level allows the administrator to take an action associated with the anomaly. For example, the administrator may unload an application that may likely have been compromised.

20 Claims, 7 Drawing Sheets

TYING ANOMALIES TO AUTHENTICATION LEVELS

FIELD

The disclosure relates generally to anomaly detection on a computer network and particularly to tying anomaly detection and management to authentication levels.

BACKGROUND

In today's world, there are a variety of solutions that can detect computer network attacks using anomaly detection. When it comes to anomaly detection, response time is critical. However, real-time anomaly detection is often difficult because of the extremely large amounts of data that needs to be processed in real-time (e.g., terabytes of data). This makes manual detection of many anomalies impossible or impractical. In addition, current automated anomaly detection solutions, while much faster than manual processes, still take too much time to identify and resolve issues. For example, if a computer network has been compromised by a new type of malware, it is critical to identify and remove the new type of malware as quickly as possible. Failure to identify and address the new type of malware quickly can mean the loss of money, highly sensitive information, business reputation, and/or the like.

SUMMARY

These and other needs are addressed by the various embodiments and configurations of the present disclosure. The present disclosure can provide a number of advantages depending on the particular configuration. These and other advantages will be apparent from the disclosure contained herein.

An anomaly on a computer network is identified by processing data generated by the computer network. The anomaly is identified based on a first anomaly threshold of a plurality of anomaly thresholds associated with the anomaly. In response to determining that the anomaly has met the first anomaly threshold of the plurality of anomaly thresholds associated with the anomaly, a first authentication level associated with the first anomaly threshold is identified. The plurality of anomaly thresholds associated with the anomaly have a plurality of associated authentication levels. A user interface is displayed to an administrator that includes a prompt to authenticate the administrator at the first authentication level. Authenticating the administrator at the first authentication level allows the administrator to take an action associated with the anomaly. For example, the administrator may unload an application that may likely have been compromised.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "blockchain" as described herein and in the claims refers to a growing list of records, called blocks, which are linked using cryptography. The blockchain is commonly a decentralized, distributed and public digital ledger that is used to record transactions across many computers so that the record cannot be altered retroactively without the alteration of all subsequent blocks and the consensus of the network. Each block contains a cryptographic hash of the previous block, a timestamp, and transaction data (generally represented as a merkle tree root hash). For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. In verifying or validating a block in the blockchain, a hashcash algorithm generally requires the following parameters: a service string, a nonce, and a counter. The service string can be encoded in the block header data structure, and include a version field, the hash of the previous block, the root hash of the merkle tree of all transactions (or information or data) in the block, the current time, and the difficulty level. The nonce can be stored in an extraNonce field, which is stored as the left most leaf node in the merkle tree. The counter parameter is often small at 32-bits so each time it wraps the extraNonce field must be incremented (or otherwise changed) to avoid repeating work. When validating or verifying a block, the hashcash algorithm repeatedly hashes the block header while incrementing the counter & extraNonce fields. Incrementing the extraNonce field entails recomputing the merkle tree, as the transaction or other information is the left most leaf node. The body of the block contains the transactions or other information. These are hashed only indirectly through the Merkle root.

As described herein and in the claims, a "computer network"/"network" may comprise a single communication device, multiple communication devices, a single computer network, multiple computer networks, a combination of these, and/or the like.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
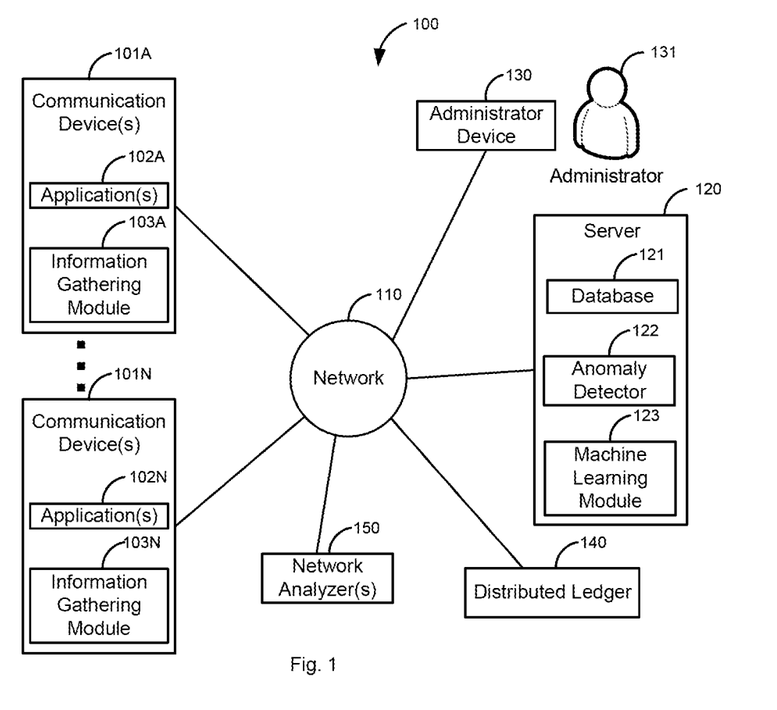
FIG. 1 is a block diagram of a first illustrative system for tying anomaly detection to authentication levels.

FIG. 1 is a block diagram of a first illustrative system 100 for tying anomaly detection to authentication levels. The first illustrative system 100 comprises communication devices 101A-101N, a network 110, a server 120, an administrator device 130, a distributed ledger 140, and network analyzer(s) 150.

In addition, an administrator 131 is shown for convenience. The administrator 131 is typically someone who administers the server 120/database 121/anomaly detector 122/machine learning module 123/distributed ledger 140. The administrator 131 may be a user.

The communication device 101 can be or may include any device that can communicate on the network 110, such as a Personal Computer (PC), a telephone, a video system, a cellular telephone, a Personal Digital Assistant (PDA), a tablet device, a notebook device, a smartphone, an embedded device, an Internet of Things (IoT) device, a server 120, a web server, a social network, an applications server, a distributed database, a firewall, and/or the like. As shown in FIG. 1, any number of communication devices 101A-101N may be connected to the network 110, including only a single communication device 101. The communication devices 101A-101N further comprise one or more applications 102A-102N and information gathering modules 103A-103N.

The application(s) 102A-102N may be any type of application 102, such as, a web application, a financial application, a database application, a security application, a firewall, a gateway, an embedded application, a testing application, a word processing application, a spreadsheet, a browser, an operating system, a printer, a sensor, a hypervisor, a container, a virtual machine, an email application, a communication application, a firmware application, a software application, a loader, and/or the like. The application(s) 102A-102N may use various types of resources, such as, memory, disk space, threads, containers, virtual machines, Central Processing Units (CPUs), ports, network interfaces, and/or the like.

The information gathering modules 103A-103N can be or may include hardware coupled with software that can gather information associated with the application(s) 102A-102N and/or the communication devices 101A-101N. The information gathering modules 103A-103N may use various techniques to gather information associated with the application(s) 102A-102N/communication devices 101A-101N, such as, tracking memory allocation, tracking thread usage, tracking stack usage, tracking heap usage, tracking container usage, tracking virtual machine usage, tracking network interface usage, tracking user logins, tracking user log outs, tracking application crashes, and/or the like. The information gathering modules 103A-103N can work at the operating system level, the application level, the container level, the virtual machine level, the hypervisor level, the network level, and/or the like.

The network 110 can be or may include any collection of communication equipment that can send and receive electronic communications, such as the Internet, a Wide Area Network (WAN), a Local Area Network (LAN), a packet switched network, a circuit switched network, a cellular network, a corporate network, a combination of these, and/or the like. The network 110 can use a variety of electronic protocols, such as Ethernet, Internet Protocol (IP), Hyper Text Transfer Protocol (HTTP), Web Real-Time Protocol (Web RTC), and/or the like. Thus, the network 110 is an electronic communication network configured to carry messages via packets and/or circuit switched communications.

While FIG. 1 shows a single network 110, the network 110 may comprise multiple networks 110. For example, the network 110 may be a corporate network 110 that comprises multiple networks 110 across different locations.

The server 120 may be any hardware coupled with software that can be used to manage anomaly detection on the network 110, such as, a network management system, a network configuration system, a network monitoring system, and/or the like. The server 120 further comprises a database 121, an anomaly detector 122, and a machine learning module 123.

The database 121 can be any type of database 121 that stores information, such as, a relational database, an objected oriented database, a distributed database, a hierarchical database, a NoSQL database, a file system, and/or the like. The database 121 is used to store captured data from the network 110/communication devices 101A-101N (i.e., information received from the information gathering modules 103A-103N/network analyzer(s) 150) to identify anomalies that may have occurred in the network 110. The database 121 may also store results of the anomaly process, such as anomaly thresholds, anomaly information, actions taken, and/or the like.

The anomaly detector 122 can be or may include any software coupled with hardware that can process the information gathered from the network 110 to identify anomalous behavior. An anomaly may be related to thread creation (e.g., an application 102 is creating an unusual amount of threads), Central Processing Unit (CPU) usage (e.g., the application 102 is using a higher percentage of the CPU than normal), disk space usage (e.g., the application 102 is using much less disk space than usual), memory usage (e.g., the application 102 is using an increased amount of memory), container creation (e.g., the hypervisor is creating an unusual amount of containers), virtual machine creation (e.g., the hypervisor is creating an unusual amount of virtual machines), container spawns (e.g., the application 102 is making an unusual amount of container spawns), virtual machine spawns (e.g., the application 102 is creating an unusual amount of virtual machine spawns), updating of components (e.g., components are being upgraded at an unusual time), usage of a port (e.g., a new port number is getting used by the application 102), user access (e.g., an unusual amount of users are accessing the application 102), packet traffic (e.g., the application 102 is generating an unusual amount of packet traffic on the network 110), heap size (e.g., the application heap size has dramatically changed), stack size (e.g., the application stack size has dramatically changed), garbage collection (e.g., the application's garbage collection process is working abnormally), memory loss (e.g., memory is not being unallocated properly), processor core assignment (e.g., an unusual amount of processor cores are being used by the application 102), login attempts/failures (e.g., an unusual amount of login attempts/failures is detected), and/or the like.

The machine learning module 123 can be or may include any software coupled with hardware that can be used to identify anomalies and generate anomaly thresholds. The machine learning module 123 may use a variety of machine learning algorithms to identify the anomalies and anomaly thresholds, such as, supervised machine learning, unsupervised machine learning, semi-supervised machine learning, clustering, reinforcement learning, self-supervised machine learning, inductive machine learning, deductive machine learning, and/or the like. For example, the machine learning algorithm may determine a regular packet transmission rate of an application 102. Based on the average and considering variances from the average, a dynamic threshold may be generated to detect a variance above or below the threshold. The machine learning algorithm may be used to detect a step attack. A step attack is where the anomaly (e.g., number of threads) slowly increases over a period of time.

The administrator device 130 is a communication device 101 used by the administrator 131 to administer the anomaly detection/machine learning process. The administrator 131 may manually set the anomaly thresholds or may incorporate the machine learning process to generate the anomaly thresholds.

The distributed ledger 140 may be used to store results of the anomaly detection/resolution. For example, the distributed ledger 140 may store identified anomalies as blocks in a blockchain in the distributed ledger 140.

The network analyzer(s) 150 are used to capture packets on the network 110. The anomaly detector 122 can use the captured packets as part of the machine learning process/anomaly detection/anomaly threshold generation. For example, a packets-per-minute threshold may be learned over time for a particular application 102. The network analyzer(s) 150 may comprise a plurality of network analyzers 150 that are located in various parts of the network 110.

Figure 2:
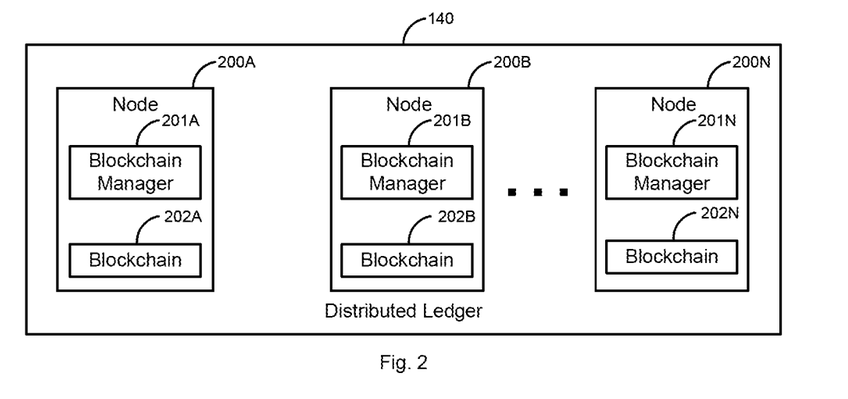
FIG. 2 is a block diagram of an exemplary distributed ledger.

FIG. 2 is a block diagram of an exemplary distributed ledger 140. The distributed ledger 140 comprises nodes 200A-200N. The nodes 200A-200N may be separate communication devices 101, separate containers, separate virtual machines, separate computer cores, and/or the like. The nodes 200A-200N comprise blockchain managers 201A-201N and blockchains 202A-202N.

The blockchain managers 201A-201N are used to create and manage the blockchains 202A-202N. The blockchain managers 201A-201N are used to add new blocks to the blockchain 202A-202N based on various types of events. For example, the blockchains 202A-202N may comprise an anomaly threshold block that stores the administered and/or learned anomaly thresholds, an anomaly block that stores information associated with a detected anomaly, a resolution block that stores information associated with how the anomaly was addressed, and/or the like.

Figure 3:
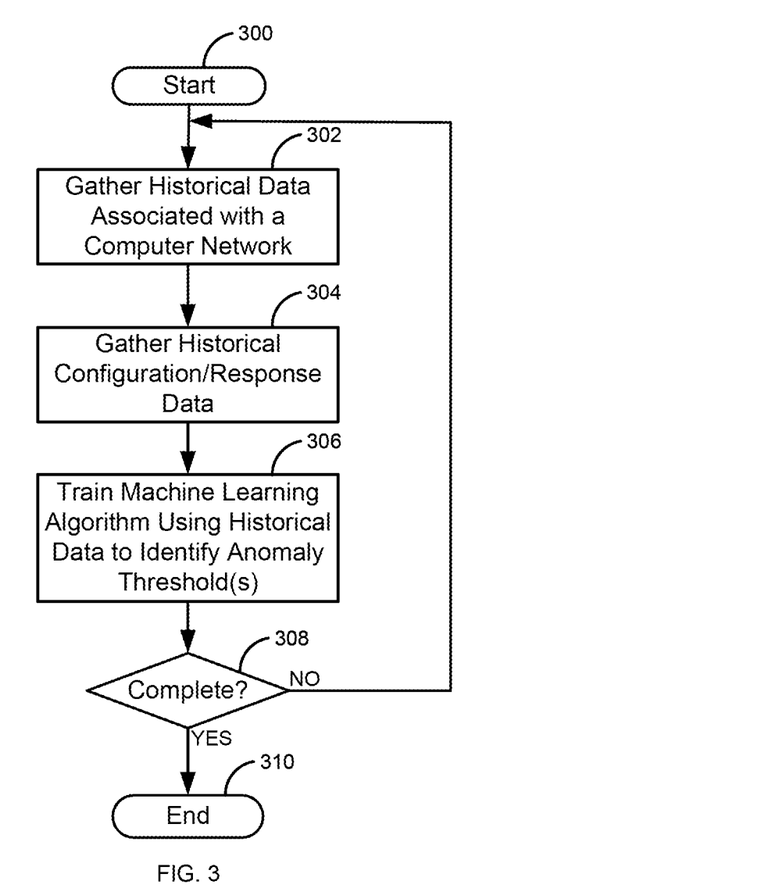
FIG. 3 is a flow diagram of a process for using machine learning to generate anomaly thresholds.
Figure 4:
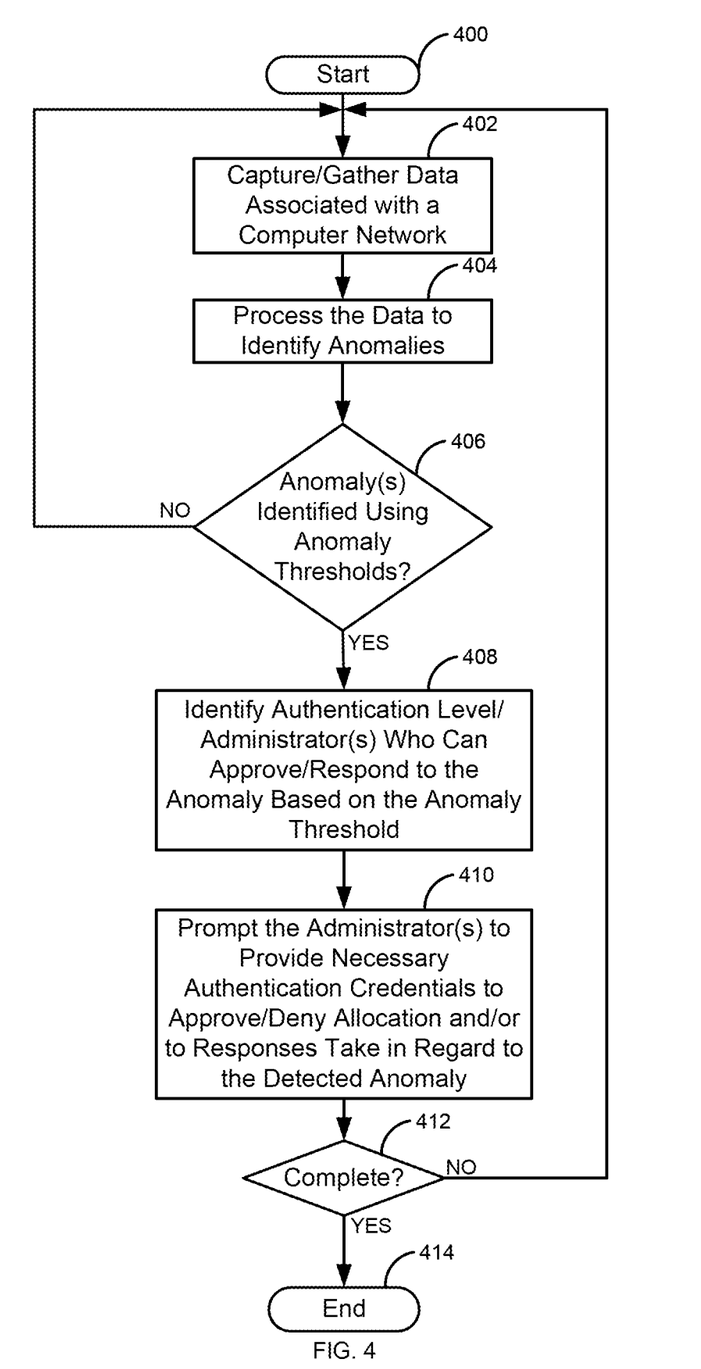
FIG. 4 is a flow diagram of a process for tying anomaly detection to authentication levels.

FIG. 3 is a flow diagram of a process for using machine learning to generate anomaly thresholds. Illustratively, the communication devices 101A-101N, the applications 102A-102N, the information gathering modules 103A-103N, the server 120, the database 121, the anomaly detector 122, the machine learning module 123, the administrator device 130, the distributed ledger 140, the network analyzer(s) 150, the nodes 200A-200N, the blockchain managers 201A-201N, and the blockchains 202A-202N are stored-program-controlled entities, such as a computer or microprocessor, which performs the method of FIGS. 3-4 and the processes described herein by executing program instructions stored in a computer readable storage medium, such as a memory (i.e., a computer memory, a hard disk, and/or the like). Although the methods described in FIGS. 3-4 are shown in a specific order, one of skill in the art would recognize that the steps in FIGS. 3-4 may be implemented in different orders and/or be implemented in a multi-threaded environment. Moreover, various steps may be omitted or added based on implementation.

The process starts in step 300. The machine learning module 123 gathers historical data associated with the network 110 in step 302. The historical data may be information gathered by the information gathering modules 103A-103N and/or the network analyzer(s) 150. The historical data associated with the network 110 may comprise resource usage by the applications 102A-102N. For example, the resource usage may be how the applications 102A-102N use hardware resources, such as, memory, disk space, CPUs, network interface cards, ports, Internet Protocol (IP) addresses, and/or the like. The historical information may comprise sent/received packets, threads created, containers created, virtual machines created, and/or the like.

The machine learning module 123 gathers historical configuration/response data in step 304. The historical configuration/response data may be how the administrator(s) 131 have responded to anomalies in the past based on a particular type of anomaly. For example, if the administrator 131 has set a maximum disk usage for application X 102 to be 400 MBs, a maximum memory usage to 100 MBs, a maximum heap size to 10 MBs, a maximum stack size of 30 MBs, and/or the like, this may be part of the historical response data gathered in step 304. The administrator 131 may have set a maximum packets sent value or set a maximum thread value to 40 concurrent threads, which would be part of the gathered historical configuration data. While maximum anomaly thresholds are discussed, the anomaly thresholds may be a minimum threshold or a combination of both. The historical response data may include data on how the administrator 131 handled the anomaly. For example, the historical response data may be that the administrator denied the memory allocation or unloaded the application 102 based on meeting an anomaly threshold.

The machine learning algorithm is trained (e.g., using a machine learning algorithm), in step 306, using the historical data from steps 302 and/or steps 304. For example, the machine learning algorithm may identify that application Z 102 shows a maximum memory usage of 162 MBs and a minimum memory usage of 80 MBs over the last five months. Based on these maximums and minimums, the machine learning module 123 may the use a percentage (e.g., +/−20%) to determine the anomaly thresholds of 194.4 MBs (Max) and 64 MBs (Minimum). In addition to a first minimum and first maximum threshold, additional thresholds can be determined. For example using a second percentage (e.g., +/−50%) a second maximum threshold (243 MBs) and a second minimum threshold (32 MBs) may be generated for the application Z 102. In this example, the threshold percentages may be based on historically administered thresholds.

The machine learning module 123 determines if the process is complete in step 308. If the process is not complete in step 308, the process goes back to step 302. This allows for real-time machine learning. The real-time learning may include identifying an anomaly type (e.g., a type of malware, a misconfigured device, and/or the like). Thus, the anomaly thresholds may change over time as the machine learning module 123 trains over time using new historical data. Otherwise, if the process is complete in step 308, the process ends in step 310.

FIG. 4 is a flow diagram of a process for tying anomaly detection to authentication levels. The process starts in step 400. The information gathering modules 103A-103N/network analyzer(s) 150/anomaly detector 122 capture/gather data associated with the network 110 in step 402. The anomaly detector 122 processes the data to identify anomalies based on the anomaly thresholds in step 404.

The anomaly detector 122 determines if there are any identified anomalies (e.g., crossing an anomaly threshold) in step 406. If there are not any identified anomalies in step 406, the process goes back to step 402.

Otherwise, if there are any identified anomalies in step 406, the anomaly detector 122 identifies an authentication level associated with the identified anomaly threshold in step 408. For example, using the example above where the first maximum anomaly threshold is 194.4 MBs for application Z 102 and the second maximum anomaly threshold is 243 MBS, if the application Z 102 requests to exceed the 194.4 MBs anomaly threshold, the anomaly detector 122 identities an associated authentication level (level one in this example) and a person who can approve the anomaly. For example, for level one authentication, the administrator(s) 131 may be required to provide a username/password to allow the application Z 102 to use more than 194.4 MBs of memory. Later, if the application Z 102 requests to exceed the second anomaly threshold of 243 MBS, a second authentication level is identified (e.g., a username/password and a fingerprint scan) for the administrator(s) 131.

An illustration of various types of exemplary anomaly thresholds and their associated authentication level/approvers is shown below in Table 1. The authentication levels are based on rules that may be machine learned and/or administered.

TABLE 1

| Type of Anomaly | Authentication Level | Required Authentication Factors | User/Groups of Approvers |
| --- | --- | --- | --- |
| Excessive Packet transmission from Application X 30% over Max | Level 2 (No Level 1) | Username/Password/Faceprint | Administrators A or B or Group A |
| Excessive Thread Usage 50% over Max for Application X | Level 1 | Username/Password | Administrators A or B |
| Excessive Thread Usage 100% over Max for Application X | Level 2 | Username/Password/Iris Scan | Administrators A and B |

TABLE 1-continued

| Type of Anomaly | Authentication Level | Required Authentication Factors | User/Groups of Approvers |
|---|---|---|---|
| Excessive Thread Usage 20% over Max for Application Y | Level 2 (No Level 1) | Username/Password/Voiceprint | Administrator B |
| Disk Space usage over 150 GB for all applications | Level 1 | Username/password | Group B |
| Disk Space usage over 300 GB for all applications | Level 2 | Username/password/Fingerprint Scan | Group B |
| External Connection on ports X-Y | Level 2 | Username/password and SMS | Administrators A, B, or C |
| VM Spawning Tenant A | Level 2 | Fingerprint Scan/SMS | Administrators D, E, or F |
| VM Spawning Tenant B | Level 2 | Username/Password/Voiceprint | Administrators G or H |
| VM Creation Tenant B | Level 3 | Username/Password/Fingerprint Scan/Faceprint | Administrators I and J |
| Memory Allocation Application Z over 50 MBs | Level 1 | Username/password | Administrator K |
| Memory Allocation Application Z over 100 MBs | Level 2 | Username/password/SMS | Administrator L |

The rules define the specific administrator(s) 131/group(s) of administrators 131 and the authentication level/authentication factors necessary to approve the additional resources/anomaly resolution.

Once the authentication level/administrator(s) 131 are identified in step 408, the administrator(s) 131 are prompted, in step 410, to provide the necessary authentication credentials to approve/deny the allocation/response to the anomaly. This can include determining which administrators 131 who are administrators 131 are currently online and prompting the administrator 131 to authenticate in real-time to allocate the resource/address the anomaly. The prompt may include a time period to reject the anomaly.

The responses that the administrator 131 may be asked to implement may vary based on the type of anomaly. For example, if multiple applications 102 on the network are behaving abnormally, the response may be to unload the multiple applications 102. Alternatively, the response may be to have a firewall block a specific IP address from sending packets outside the network 110.

The anomaly detector 122 determines, in step 412, if the process is complete. If the process is not complete in step 412, the process goes back to step 402. Otherwise, if the process is complete in step 412, the process ends in step 414.

The process described in FIG. 4 can work for other types of anomalies. For example, if a component has been updated, the administrator 131 may be asked to allow installation and/or execution of the newly installed component. The displayed information can include who is requesting the update, a list of components, etc. The administrator 131 may be able to approve each component that is in the update and/or the whole update. The approval could apply at the network level, where the approver approves all changes for all devices on the network 110.

Figure 5:
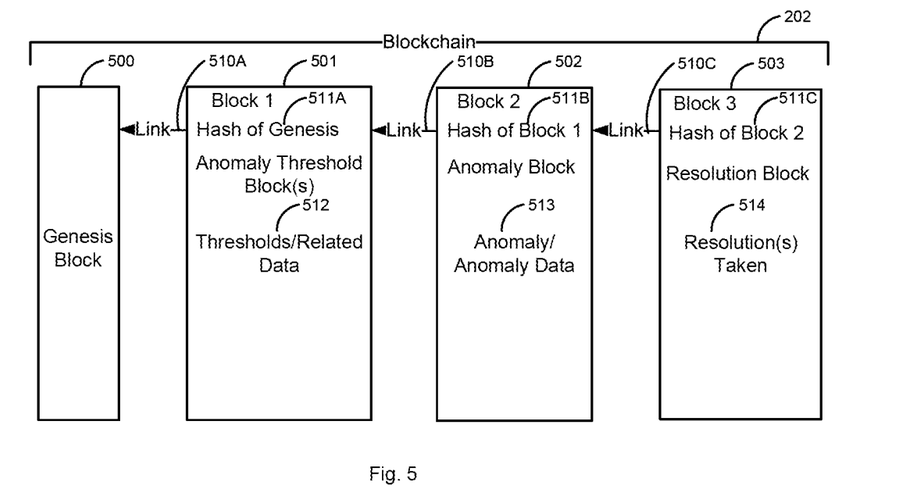
FIG. 5 is a block diagram of an exemplary blockchain that stores anomaly information.

FIG. 5 is a block diagram of an exemplary blockchain 202 that stores anomaly information. The blockchain 202 comprises a genesis block 500, an anomaly threshold block(s) 501, an anomaly block 502, and a resolution block 503.

The blockchain 202 is linked together by links 510A-510C. Other than the genesis block 500, each block 501-503 has a hash 511 of the previous block as is traditionally done in blockchains 202. For example, the anomaly threshold block 501 has a hash 511A of the genesis block 500. The anomaly block 502 has a hash 511B of the anomaly threshold block 501. Likewise, the resolution block 503 has a hash 511C of the anomaly block 502.

The genesis block 500 is created when the blockchain 202 is created. The anomaly threshold block 501 is created when an administrator defines an anomaly threshold 131 and/or generated by the machine learning algorithm. For example, as the machine learning algorithm learns over time, the anomaly thresholds may change. In this case there may be multiple anomaly threshold blocks 501. Likewise, an administrator 131 may change an anomaly threshold, thus creating a new anomaly threshold block 501. The anomaly threshold block 501 comprises the anomaly thresholds/related data 512. The anomaly thresholds/related data may comprise maximum anomaly thresholds, minimum anomaly thresholds, associated authentication factors (e.g., username/password/iris scan) for the anomaly thresholds, associated administrators 131, creation date, who generated the anomaly thresholds (an administrator 131/machine learning), and/or the like.

While the anomaly threshold block 501 is described for a single anomaly, the anomaly threshold block 501 may comprise anomaly thresholds for multiple anomalies. The machine learning algorithm may generate anomaly thresholds for multiple anomalies associated with an application(s) 102/network 110. For example, the thresholds/related data 512 may comprise a code coverage anomaly threshold, a memory usage anomaly threshold, a packets per second anomaly threshold, and a disk space usage anomaly threshold in the same anomaly threshold block 501.

The anomaly block 502 includes the anomaly (e.g., the anomaly name/type). The anomaly block 502 further comprises the anomaly/anomaly data 513. For example, the anomaly may be an excessive number of packets being generated by application Y 120. The anomaly block 502 may comprise multiple related anomalies. For example, the anomaly/anomaly data 513 may comprise a CPU usage anomaly and a memory usage anomaly associated with an application 102 running on the communication device 101.

The resolution block 503 includes the resolution taken. The resolution block 503 further comprises a resolution(s)

taken field 514. The resolutions taken may be any actions taken in relation to the anomaly, such as, denying an anomaly (e.g., denying a memory allocation), unloading an application 102, blocking a port, quarantining an application 102, blocking a container/virtual machine creation, blocking loading of an application, forcing upgrading of an application 102, taking no action, and/or the like.

Although not shown in FIG. 5, the blockchain 202 may continue to grow over time. For example, as new anomaly thresholds are generated by the machine learning process, additional anomaly threshold blocks 501 may be added to the blockchain 202. In addition, as new anomalies are detected, additional anomaly blocks 502/resolution blocks 503 may be added to the blockchain 202.

Figure 6:
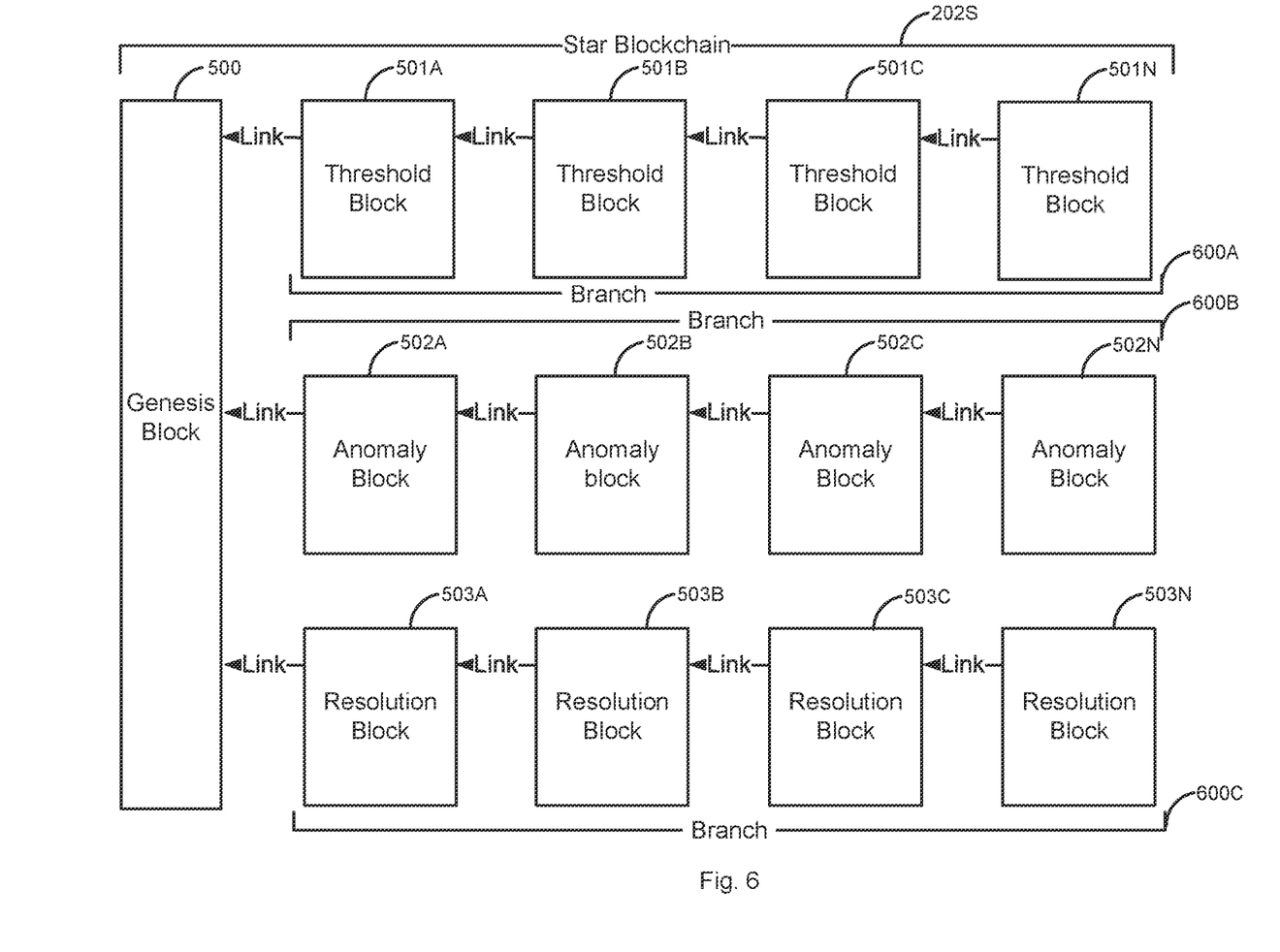
FIG. 6 is a block diagram of an exemplary star blockchain that stores anomaly information.

FIG. 6 is a block diagram of an exemplary star blockchain 202S that stores anomaly information. The structure of the star blockchain 202S is different from the blockchain 202. In FIG. 6, each of the different types of blocks 501-503 are stored in separate branches 600A-600C of the star blockchain 202S.

The star blockchain 202S comprises the genesis block 500 and branches 600A-600C. The branch 600A comprises threshold blocks 501A-501N. The branch 600B comprises anomaly blocks 502A-502N. The branch 600C comprises resolution blocks 503A-503N. Each of the branches 600A-600C are linked together in the same manner as the blockchain 202 described in FIG. 5.

Figure 7:
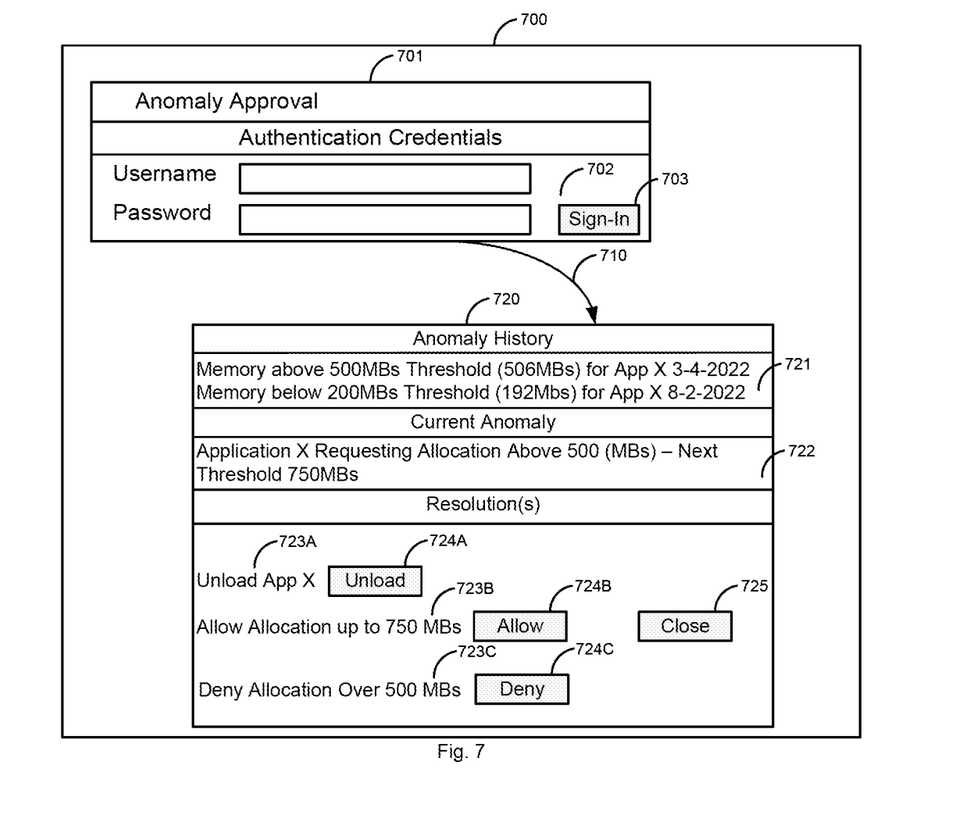
FIG. 7 is a diagram of user interface where an administrator authenticates at an authentication level and is prompted to take an action associated with an anomaly.

FIG. 7 is a diagram of user interface 700 where an administrator 131 authenticates at an authentication level and is prompted to take an action associated with an anomaly. The user interface 700 comprises an authentication window 701 and an anomaly resolution window 720. FIG. 7 is an example of what is displayed to an administrator 131 as described in step 410 of FIG. 4.

If an anomaly threshold is met, the administrator 131 is prompted with the authentication window 701. Based on the authentication level/authentication credentials that are required for the anomaly threshold, the authentication window 701 is displayed. In this example, only a username/password 702 is required. However, if additional authentication credentials are required for the anomaly threshold, the authentication window 701 may be different. For example, if the administrator 131 is also required to provide a facial scan, the administrator 131 may be asked to provide a facial scan via the authentication window or via another device.

Once the administrator 131 has provided valid authentication credentials in step 710 (e.g., by entering the username/password and clicking on the sign-in button 703), the anomaly resolution window 720 is displayed to the administrator 131. The anomaly resolution window 720 comprises an anomaly history 721, a description of the anomaly 722, anomaly resolutions 723A-723C, anomaly resolution buttons 724A-724C, and a close button 725.

The anomaly history 721 shows that for application X 102 that the maximum anomaly threshold of 500 MBs was exceeded by 6 MBs on Mar. 4, 2022. In addition, the minimum anomaly threshold of 200 MBs was met (192 MBs) on Aug. 2, 2022. Although not shown, a resolution associated with the previous violations of the anomaly thresholds may be displayed in the anomaly history 721.

The current anomaly is that the application X 102 is requesting a memory allocation above 500 MBs as shown in the description of the anomaly 722.

The anomaly resolutions 723A-723C give the administrator 131 three options: 1) to unload application X 102, 2) to allow the memory allocation up to 750 MBs (the next anomaly threshold), or 3) to deny the memory allocation.

The administrator 131 can choose any one of the three options by selecting the corresponding anomaly resolution button 724A-724C. If the administrator 131 does not want to take an action, the administrator 131 may just close the anomaly resolution window 720 by selecting the close button 725.

Other resolutions may include blocking a port associated with the anomaly, denying a user login, logging out a user, removing a user, changing the first anomaly threshold (e.g., the user may be provided a window to change the anomaly threshold), suspending execution of an anomaly generating event, and/or the like.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a computer readable medium coupled with the microprocessor and comprising microprocessor readable and executable instructions that, when executed by the microprocessor, cause the microprocessor to:

identify an anomaly on a computer network by processing data generated by the computer network, wherein the anomaly is identified based on a first anomaly threshold associated with the anomaly;

in response to determining that the anomaly has met the first anomaly threshold associated with the anomaly, identify a first authentication level associated with the first anomaly threshold; and generate, for display to a first administrator, a first prompt to authenticate the first administrator at the first authentication level, wherein authenticating the first administrator at the first authentication level allows the first administrator to take a first action associated with the anomaly.

2. The system of claim 1, wherein the first anomaly threshold comprises a plurality of anomaly thresholds associated with a plurality of authentication levels and wherein the computer readable and executable instructions further cause the microprocessor to:

determine that the anomaly has met a second anomaly threshold of the plurality of anomaly thresholds;

in response to determining that the anomaly has met the second anomaly threshold of the plurality of anomaly thresholds, identify a second authentication level associated with the second anomaly threshold; and generate, for display to the first administrator and/or a second administrator, a second prompt to authenticate the first administrator and/or the second administrator at the second authentication level, wherein authenticating the first administrator and/or the second administrator at the second authentication level allows the first administrator and/or the second administrator to take a second action associated with the anomaly.

3. The system of claim 1, wherein the first anomaly threshold and/or an anomaly type are generated by a machine learning algorithm in real-time.

4. The system of claim 3, wherein the machine learning algorithm uses administrator approval/disapproval histories associated with the anomaly to generate the first anomaly threshold.

5. The system of claim 1, wherein the first action associated with the anomaly is one or more of: approving a resource allocation associated with the anomaly, denying a resource allocation associated with the anomaly, unloading an application associated with the anomaly, blocking a port associated with the anomaly, denying a user login, logging out a user, removing a user, suspending execution of an anomaly generating event, and changing the first anomaly threshold.

6. The system of claim 1, wherein the anomaly is based on one or more of: thread creation, CPU usage, disk space usage, memory usage, container creation, virtual machine creation, container spawns, virtual machine spawns, updating of components, usage of a port, user access, packet traffic, heap size, stack size, garbage collection, memory loss, processor core assignment, and login attempts/failures.

7. The system of claim 1, wherein the first anomaly threshold comprises a plurality of anomaly thresholds and wherein the plurality of anomaly thresholds comprises one of: a plurality of maximum anomaly thresholds, a plurality of minimum anomaly thresholds, or a combination of one or more maximum anomaly thresholds and one or more minimum anomaly thresholds.

8. The system of claim 1, wherein the anomaly is stored in an anomaly block of a blockchain, wherein the first anomaly threshold is stored in an anomaly threshold block of the blockchain, and wherein results of the first prompt are stored in a resolution block of the blockchain.

9. The system of claim 8, wherein the first anomaly threshold comprises a plurality of anomaly thresholds and wherein the anomaly threshold block of the blockchain comprises a plurality of authentication factors associated with the plurality of anomaly thresholds.

10. The system of claim 8, wherein the blockchain is a star blockchain.

11. The system of claim 10, wherein the anomaly block, the anomaly threshold block, and the resolution block are stored in separate branches of the star blockchain.

12. A method comprising:

identifying, by a microprocessor, an anomaly on a computer network by processing data generated by the computer network, wherein the anomaly is identified based on a first anomaly threshold associated with the anomaly;

in response to determining that the anomaly has met the first anomaly threshold associated with the anomaly, identifying, by the microprocessor, a first authentication level associated with the first anomaly threshold; and generating, by the microprocessor, for display to a first administrator, a first prompt to authenticate the first administrator at the first authentication level, wherein authenticating the first administrator at the first authentication level allows the first administrator to take a first action associated with the anomaly.

13. The method of claim 12, wherein the first anomaly threshold comprises a plurality of anomaly thresholds associated with a plurality of authentication levels and further comprising:

determining, by the microprocessor, that the anomaly has met a second anomaly threshold of the plurality of anomaly thresholds;

in response to determining that the anomaly has met the second anomaly threshold of the plurality of anomaly thresholds, identifying, by the microprocessor, a second authentication level associated with the second anomaly threshold; and generating, by the microprocessor, for display to the first administrator and/or a second administrator, a second prompt to authenticate the first administrator and/or the second administrator at the second authentication level, wherein authenticating the first administrator and/or the second administrator at the second authentication level allows the first administrator and/or the second administrator to take a second action associated with the anomaly.

14. The method of claim 12, wherein the first anomaly threshold and/or an anomaly type are generated by a machine learning algorithm in real-time.

15. The method of claim 14, wherein the machine learning algorithm uses administrator approval/disapproval histories associated with the anomaly to generate the first anomaly threshold.

16. The method of claim 12, wherein the first anomaly threshold comprises a plurality of anomaly thresholds and wherein the plurality of anomaly thresholds comprises one of: a plurality of maximum anomaly thresholds, a plurality of minimum anomaly thresholds, or a combination of one or more maximum anomaly thresholds and one or more minimum anomaly thresholds.

17. The method of claim 12, wherein the anomaly is stored in an anomaly block of a blockchain, wherein the first anomaly threshold is stored in an anomaly threshold block of the blockchain, and wherein results of the first prompt are stored in a resolution block of the blockchain.

18. The method of claim 17, wherein the first anomaly threshold comprises a plurality of anomaly thresholds associated with the anomaly and wherein the anomaly threshold block of the blockchain comprises a plurality of authentication factors associated with the plurality of anomaly thresholds.

19. The method of claim 17, wherein the blockchain is a star blockchain and wherein the anomaly block, the anomaly threshold block, and the resolution block are stored in separate branches of the star blockchain.

20. A non-transient computer readable medium having stored thereon instructions that cause a processor to execute a method, the method comprising instructions to:
- identify an anomaly on a computer network by processing data generated by the computer network, wherein the anomaly is identified based on an anomaly threshold associated with the anomaly;
- in response to determining that the anomaly has met the anomaly threshold associated with the anomaly, identify an authentication level associated with the anomaly threshold; and
- generate, for display to an administrator, a prompt to authenticate the administrator at the authentication level, wherein authenticating the administrator at the authentication level allows the administrator to take an action associated with the anomaly.

* * * * *